(12) United States Patent
Wiebe

(10) Patent No.: US 8,622,016 B2
(45) Date of Patent: Jan. 7, 2014

(54) WEAR INDICATION SYSTEM FOR COMPRESSOR DIAPHRAGMS OF GAS TURBINE ENGINES

(75) Inventor: David J. Wiebe, Orlando, FL (US)

(73) Assignee: Siemens Energy, Inc., Orlando, FL (US)

( * ) Notice: Subject to any disclaimer, the term of this patent is extended or adjusted under 35 U.S.C. 154(b) by 218 days.

(21) Appl. No.: 13/252,429

(22) Filed: Oct. 4, 2011

(65) Prior Publication Data

US 2013/0084163 A1  Apr. 4, 2013

(51) Int. Cl.
*G01D 21/00* (2006.01)
*F16D 66/02* (2006.01)

(52) U.S. Cl.
CPC ............................ *F16D 66/02* (2013.01)
USPC ........................................................ 116/208

(58) Field of Classification Search
USPC ........................................................ 116/208
See application file for complete search history.

(56) References Cited

U.S. PATENT DOCUMENTS

| | | | | |
|---|---|---|---|---|
| 2,706,509 A * | 4/1955 | White | ................... | 152/209.21 |
| 4,336,292 A * | 6/1982 | Blair | ................... | 428/116 |
| 4,749,299 A * | 6/1988 | Swanson | ................... | 403/27 |
| 5,314,304 A | 5/1994 | Wiebe | | |
| 5,428,437 A * | 6/1995 | Carter et al. | ................... | 399/18 |
| 6,415,735 B1 * | 7/2002 | Rogers | ................... | 116/208 |
| 6,786,153 B2 * | 9/2004 | Burrow et al. | ................... | 101/352.13 |
| 7,695,211 B1 * | 4/2010 | Wofford et al. | ................... | 403/27 |
| 2005/0252727 A1 * | 11/2005 | England et al. | ................... | 188/1.11 L |
| 2008/0275599 A1 * | 11/2008 | DeVlieg | ................... | 701/16 |
| 2011/0033283 A1 * | 2/2011 | Chrzastek et al. | ................... | 415/174.2 |
| 2011/0120830 A1 * | 5/2011 | Heidenreich et al. | ................... | 192/56.6 |
| 2011/0247846 A1 * | 10/2011 | Greuel et al. | ................... | 172/796 |
| 2011/0254679 A1 * | 10/2011 | Todd et al. | ................... | 340/454 |

* cited by examiner

*Primary Examiner* — David A Rogers

(57) ABSTRACT

A wear indication system for use in turbine engines to measure gap closure that indicates the amount of wear found on a compressor diaphragm outer hook to prevent contact between a compressor vane attached to the compressor diaphragm outer hook and an upstream compressor blade. The wear indication system enables the wear to be serviced before failure occurs. The wear indication system may be formed from a base mounting plate having one or more wearable material layers attached thereto. In one embodiment, the wear indication system may have multiple wearable material layers. The outermost wearable layer may have a cross-sectional area less than a wearable layer to which it is attached to enable visual determination of the amount of wear that has occurred. The wearable layers may be formed from a honeycomb shaped material enabling wear to occur without threatening downstream components with damage.

20 Claims, 2 Drawing Sheets

WEAR INDICATION SYSTEM FOR COMPRESSOR DIAPHRAGMS OF GAS TURBINE ENGINES

FIELD OF THE INVENTION

This invention is directed generally to gas turbine engines, and more particularly to wear indication systems for turbine systems in gas turbine engines.

BACKGROUND

Typically, gas turbine engines include a compressor for compressing air, a combustor for mixing the compressed air with fuel and igniting the mixture, and a turbine blade assembly for producing power. The compressor and turbine assemblies are formed of blades attached to a rotor interspersed with stationary stator vanes. The compressor and turbine assemblies include blades extending radially outward therefrom that are cooled with internal cooling systems and are collected into rows. Vanes extend radially inward and are collected into rows that are positioned between the rows of compressor and turbine assemblies. The stationary vane assemblies include seal arrangements with the rotor.

During operation, a seal holder attached to a stator vane tends to move upstream due to the pressure load acting in an upstream direction. The pressure load acts upstream because of a pressure difference between leading and trailing edges of the stator vane. During turbine engine operation as the compressor diaphragm outer hook wears, the upstream gap between the stator vane and the upstream rotor disk gradually reduces over time. As the stator vane moves toward the rotor disk, the gap reduces in size, and the seal holder will contact the rotor disk, which results in damage of rotor disk, the seal holder, and domestic damage of the compressor.

A wear pin has been used to determine the rate of closure of the gap between the stator vane and the rotor disk. The closure rate has been used to predict when the seal holder will hit the rotor disk. Such prediction has been used to schedule proper maintenance. The wear pin is usually formed from a plastic with low shear strength so that the wear pin wears without damaging the rotor disk upon which the wear pin contacts. The wear pin typically includes a threaded base and is screwed into place. The plastic wear pin often becomes brittle and breaks apart due to the compressor heat. As such, the wear pin becomes ineffective at predicting the gap closure rate. Thus, a need exists for a more robust system for determining compressor diaphragm outer hook wear.

SUMMARY OF THE INVENTION

This invention relates to a wear indication system for use in turbine engines to measure gap closure that indicates the amount of wear found on a compressor diaphragm outer hook to prevent contact between a compressor vane attached to the compressor diaphragm outer hook and an upstream compressor blade. The wear indication system enables the wear to be identified, and the wear serviced before failure occurs. The wear indication system may be formed from a base mounting plate having at least one wearable material receiving surface. Two or more wearable material layers may be attached to the base mounting plate. The outermost wearable layer may have a cross-sectional area less than a wearable layer to which it is attached to enable visual determination of the amount of wear that has occurred. The wearable layers may be formed from a honeycomb shaped material enabling wear to occur to the layers without threatening downstream components with damage.

The wear indication system for identifying outer hook wear in turbine engines may include a base mounting plate having at least one wearable material receiving surface. The base mounting plate may extend radially beyond the first wearable material layer and may include at least one orifice usable to attach the base mounting plate to a turbine component.

The wear indication system may also include a first wearable material layer having a first surface attached to the wearable material receiving surface and a second surface on an opposite side of the first wearable material layer from the first surface. A second wearable material layer may have a first surface attached to a second surface of the first wearable material layer, wherein a cross-sectional area of the second wearable material layer is less than a cross-sectional area of the first wearable material layer. The first and second wearable material layers may have generally cylindrically shaped side surfaces, as shown in FIG. 3, or may be generally rectangular, as shown in FIG. 5.

The wear indication system may include a releasable connector extending from the base mounting plate for attaching the wear indication system to an inner seal of a compressor vane. In at least one embodiment, the releasable connector may be a threaded shaft.

The first wearable material layer may be formed from honeycomb shaped material. The honeycomb shaped material may be oriented such that channels within the honeycomb shaped material extend from the first surface to the second surface of the first wearable material layer. The second wearable material layer may also be formed from honeycomb shaped material. The honeycomb shaped material may be oriented such that channels within the honeycomb shaped material extend from the first surface to the second surface of the second wearable material layer as well. The honeycomb shaped material may be formed from materials, such as, but not limited to, metallic foil. The metallic foil may have a thickness of between about 0.005 inch and about 0.020 inch.

The wear indication system may include three or more wearable material layers. For instance, in another embodiment, the wear indication system may include a third wearable material layer having a first surface attached to a second surface of the second wearable material layer, wherein a cross-sectional area of the third wearable material layer is less than a cross-sectional area of the second wearable material layer. The third wearable material layer may be formed from a honeycomb shaped material.

An advantage of this invention is that the wearable material layers may be formed from a material capable of wearing to indicate material loss at the outer hook without creating projectiles that may possibly damage downstream turbine components.

Another advantage of this invention is that the honeycomb shaped wearable material layers may be formed from one or more metals capable of withstanding the hot environment found within a compressor of a turbine engine.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
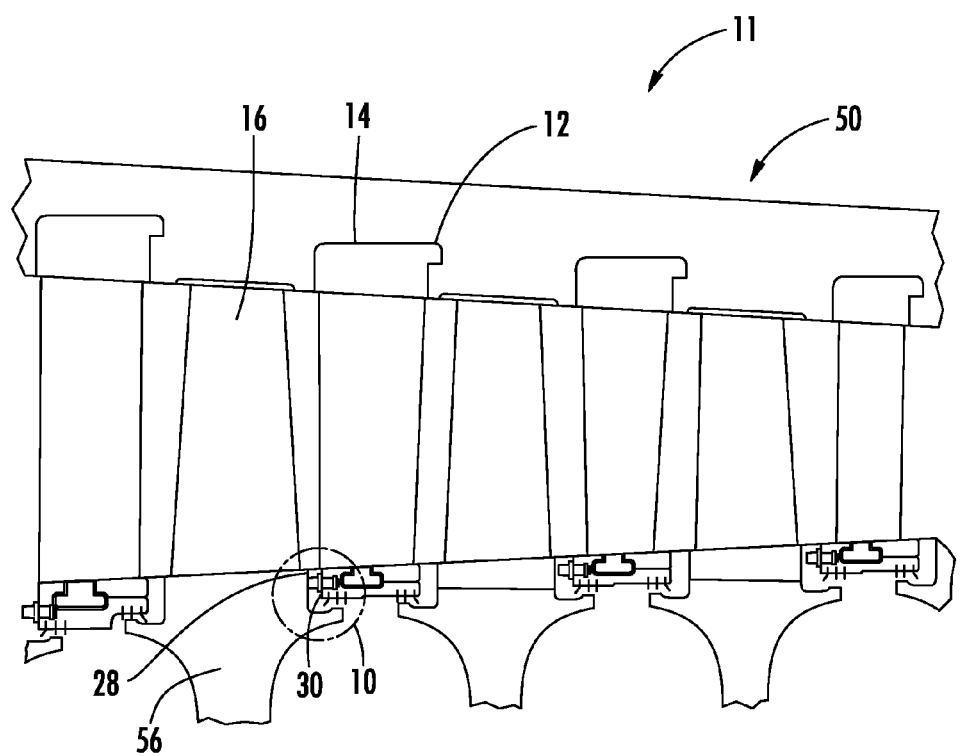
FIG. 1 is a partial side view of a turbine engine with a wear indication system attached in close proximity to a rotor disc.

As shown in FIGS. 1-5, this invention is directed to a wear indication system 10 for use in turbine engines 11 to measure gap closure that indicates the amount of wear found on a compressor diaphragm outer hook 12 to prevent contact between a compressor vane 14 attached to the compressor diaphragm outer hook 12 and an upstream compressor blade 16. The wear indication system 10 enables the wear to be identified and the wear serviced before failure occurs. The wear indication system 10 may be formed from a base mounting plate 18 having at least one wearable material receiving surface 20. At least two wearable material layers 22 may be attached to the base mounting plate 18. The outermost wearable layer 54 may have a cross-sectional area less than one or more wearable layers 24 to which it is attached to enable visual determination of the amount of wear that has occurred. The wearable layers 22 may be formed from a honeycomb shaped material enabling wear to occur without threatening downstream components with damage.

Figure 2:
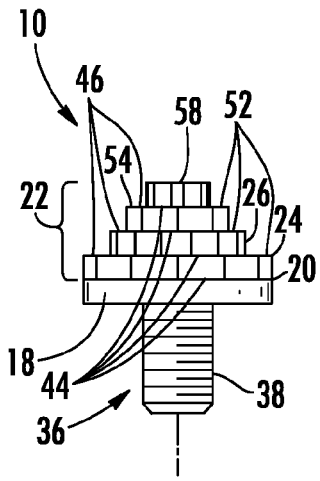
FIG. 2 is a side view of the wear indication system.
Figure 3:
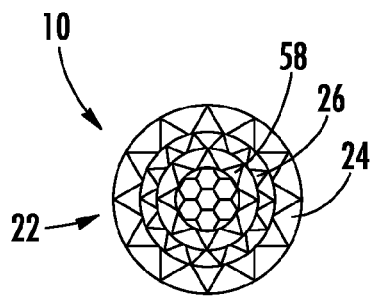
FIG. 3 is a top view of the wear indication system shown in FIG. 2.
Figure 4:
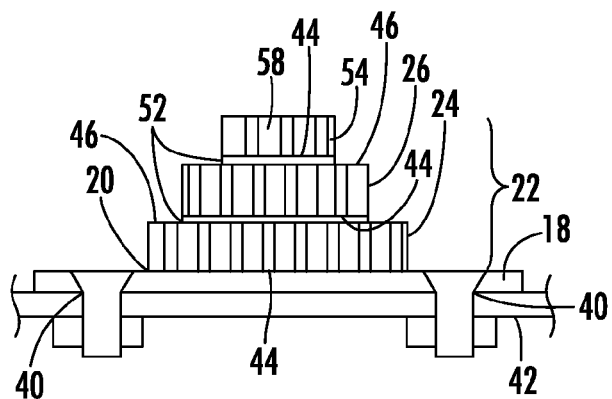
FIG. 4 is a side view of an another embodiment of the wear indication system.

The wear indication system 10 for identifying outer hook wear in turbine engines 11 may be formed from a base mounting plate 18 having at least one wearable material receiving surface 20, as shown in FIGS. 2 and 4. The base mounting plate 18 may be in the form of a plate or other appropriate structure. The wearable material receiving surface 20 may be flat or otherwise structured to receive a wearable material layer 22. The base mounting plate 18 may be generally cylindrical or have another appropriate shape. The base mounting plate 18 may be formed from any material, such as, but not limited to, metal, capable of withstanding high temperatures that are found in the compressor 50.

Figure 5:
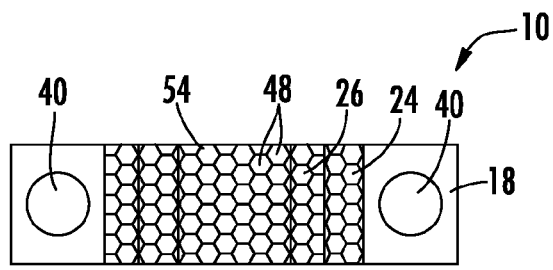
FIG. 5 is a top view of the wear indication system shown in FIG. 4.

The base mounting plate 18 may be releasably attachable to an upstream side 28 of an inner seal 30. As the wear occurs to the compressor diaphragm outer hook 12, the compressor vane 14 tilts upstream causing the inner seal 30 of the diaphragm to move generally upstream. The base mounting plate 18 may include a releasable connector 36 extending from the base mounting plate 18. In one embodiment, as shown in FIG. 2, the releasable connector 36 may be a threaded shaft 38. In another embodiment, as shown in FIGS. 4 and 5, the base mounting plate 18 may extend radially beyond the first wearable material layer 24 and may include one or more orifices 40 usable to attach the base mounting plate 18 to a turbine component 42.

The wear indication system 10 may also include one or more wearable material layers 22. In one embodiment, wear indication system 10 may include a single wearable layer 22 with two or more reduced sized sections, with the smaller section being positioned opposite from the base mounting plate 18, to enable one to determine whether wear to the outer hook needs to be serviced by looking at the wear that has occurred to the single wearable layer 22.

In another embodiment, as shown in FIGS. 2-5, the wear indication system 10 may be formed from two or more wearable material layers 22. The wear indication system 10 may be formed from a first wearable material layer 24 having a first surface 44 attached to the wearable material receiving surface 20 and a second surface 46 on an opposite side of the first wearable material layer 24 from the first surface 44. The first wearable material layer 24 may be attached to the wearable material receiving surface 20 via brazing or through other appropriate methods. A second wearable material layer 26 may have a first surface 44 attached to a second surface 46 of the first wearable material layer 24. A cross-sectional area of the second wearable material layer 26 may be less than a cross-sectional area of the first wearable material layer 24, thereby enabling visual inspection of the wear indication system 10 with a bore-scope to easily determine whether wear to the outer hook needs to be serviced. Such a configuration creates tiers or steps that are easily seen.

The first wearable material layer 24 may be formed from a honeycomb shaped material. The second wearable material layer 26 may also be formed from honeycomb shaped material. The honeycomb shaped material may be oriented such that channels 48 within the honeycomb shaped material extend from the first surface 44 to the second surface 46 of the first and second wearable material layers 24 and 26. The honeycomb shaped material may be formed from a material that is capable of withstanding the heat formed in the compressor 50, such as, but not limited to, a metallic foil. The metallic foil may be sized such that if a piece of the foil breaks free and is swept downstream during turbine engine operation, the downstream components are not likely to suffer damage. As such, the metallic foil may have a thickness of between about 0.005 inch and about 0.020 inch. The first and second wearable material layers 24, 26 may be separated by a support layer 52, as shown in FIGS. 2 and 4. The second wearable layer 26 and a third wearable material layer 54 may be separated with a support layer 52, as shown in FIGS. 2 and 4. The third wearable material layer 54 and other outer wearable layers may be separated with a support layer 52, as shown in FIGS. 2 and 4. The support layer 52 may be, but is not limited to being, a thin foil layer. The support layer 52 may be attached to the adjacent wearable material layers 22 by brazing or other appropriate manner.

In another embodiment, as shown in FIG. 4, the wear indication system 10 may be include the third wearable material layer 54 having a first surface 44 attached to a second surface 46 of the second wearable material layer 26, whereby a cross-sectional area of the third wearable material layer 54 is less than a cross-sectional area of the second wearable material layer 26. The third wearable material layer 54 may be formed from a honeycomb shaped material. In other embodiments, the wear indication system 10 may include four or more wearable material layers 22.

In one embodiment, the first, second and third wearable material layers 24, 26 and 54 may have generally cylindrically shaped side surfaces. As such, the wearable material layers, 24, 26 and 54 form a conical configuration formed by a plurality of tiers that enable one to easily determine visually the amount of wear on the outer hook 12 by viewing the wear on the first, second and third wearable material layers 24, 26 and 54.

As shown in FIG. 1, the wear indication system 10 may be attached to an inner seal of a compressor vane 14 and may extend upstream toward an upstream compressor blade 16. During turbine engine operation, the compressor diaphragm outer hook 12 may be become worn and cause an outer surface 58 of the wear indication system 10 to contact a rotor 56 to which the upstream compressor blade 16 is attached. As the compressor diaphragm outer hook 12 continues to wear down from turbine engine operation, the outer surface 58 of the wear indication system 10 continues to wear down. The amount of wear to the compressor diaphragm outer hook 12 can be determined by observing the wear to the outer surface 58 of the wear indication system 10. Because the wearable material layers 22 of the wear indication system 10 are formed from honeycomb shaped material, any material that is worn from the wear indication system 10 is small enough not to create a substantial risk to downstream turbine components.

The foregoing is provided for purposes of illustrating, explaining, and describing embodiments of this invention. Modifications and adaptations to these embodiments will be apparent to those skilled in the art and may be made without departing from the scope or spirit of this invention.

I claim:

1. A wear indication system for identifying outer hook wear in turbine engines, comprising:
    a base mounting plate having at least one wearable material receiving surface;
    a first wearable material layer having a first surface attached to the at least one wearable material receiving surface and a second surface on an opposite side of the first wearable material layer from the first surface;
    a second wearable material layer having a first surface attached to a second surface of the first wearable material layer, wherein a cross-sectional area of the second wearable material layer is less than a cross-sectional area of the first wearable material layer; and
    wherein the first wearable material layer is formed from a honeycomb shaped material.

2. The wear indication system of claim 1, wherein the base mounting plate extends radially beyond the first wearable material layer and includes at least one orifice usable to attach the base mounting plate to a turbine component.

3. The wear indication system of claim 1, wherein the first and second wearable material layers have generally cylindrically shaped side surfaces.

4. The wear indication system of claim 1, further comprising a releasable connector extending from the base mounting plate including a threaded shaft.

5. The wear indication system of claim 4, further comprising a support layer between the first and second wearable material layers.

6. The wear indication system of claim 1, wherein the honeycomb shaped material is oriented such that channels within the honeycomb shaped material extend from the first surface to the second surface of the first wearable material layer.

7. The wear indication system of claim 1, wherein the second wearable material layer is formed from a honeycomb shaped material.

8. The wear indication system of claim 7, wherein the honeycomb shaped material is oriented such that channels within the honeycomb shaped material extend from the first surface to the second surface of the second wearable material layer.

9. The wear indication system of claim 1, further comprising a third wearable material layer having a first surface attached to a second surface of the second wearable material layer, wherein a cross-sectional area of the third wearable material layer is less than a cross-sectional area of the second wearable material layer.

10. The wear indication system of claim 9, wherein the third wearable material layer is formed from a honeycomb shaped material.

11. The wear indication system of claim 1, wherein the honeycomb shaped material is formed from metallic foil.

12. The wear indication system of claim 11, wherein the metallic foil has a thickness of between about 0.005 inch and about 0.020 inch.

13. A wear indication system for identifying outer hook wear in turbine engines, comprising:
    a base mounting plate having at least one wearable material receiving surface;
    a first wearable material layer having a first surface attached to the at least one wearable material receiving surface and a second surface on an opposite side of the first wearable material layer from the first surface;
    a second wearable material layer having a first surface attached to a second surface of the first wearable material layer and a second surface on an opposite side of the second wearable material layer from the first surface, wherein a cross-sectional area of the second wearable material layer is less than a cross-sectional area of the first wearable material layer;
    wherein the first and second wearable material layers are formed from a honeycomb shaped material;
    wherein the honeycomb shaped materials of the first and second wearable material layers are formed from metallic foil; and
    wherein the honeycomb shaped material is oriented such that channels within the honeycomb shaped material extend from the first surface to the second surface of the first and second wearable material layers.

14. The wear indication system of claim 13, further comprising a releasable connector extending from the base mounting plate, and wherein the releasable connector is a threaded shaft.

15. The wear indication system of claim 13, wherein the base mounting plate extends radially beyond the first wearable material layer and includes at least one orifice usable to attach the base mounting plate to a turbine component.

16. The wear indication system of claim 13, further comprising a third wearable material layer having a first surface attached to a second surface of the second wearable material layer, wherein a cross-sectional area of the third wearable material layer is less than a cross-sectional area of the second wearable material layer, and wherein the third wearable material layer is formed from honeycomb shaped material.

17. The wear indication system of claim 13, wherein the metallic foil has a thickness of between about 0.005 inch and about 0.020 inch.

18. The wear indication system of claim 13, wherein the first and second wearable material layers have generally cylindrically shaped side surfaces.

19. A wear indication system for identifying outer hook wear in turbine engines, comprising:
    a base mounting plate having at least one wearable material receiving surface;
    a first wearable material layer having a first surface attached to the at least one wearable material receiving surface and a second surface on an opposite side of the first wearable material layer from the first surface;
    a second wearable material layer having a first surface attached to a second surface of the first wearable material layer and a second surface on an opposite side of the second wearable material layer from the first surface, wherein a cross-sectional area of the second wearable material layer is less than a cross-sectional area of the first wearable material layer;
    wherein the first and second wearable material layers are formed from a honeycomb shaped material;

wherein the honeycomb shaped materials of the first and second wearable material layers are formed from metallic foil;

a third wearable material layer having a first surface attached to a second surface of the second wearable material layer and a second surface on an opposite side of the third wearable material layer from the first surface, wherein a cross-sectional area of the third wearable material layer is less than a cross-sectional area of the second wearable material layer, and the third wearable material layer is formed from honeycomb shaped material;

wherein the honeycomb shaped material is oriented such that channels within the honeycomb shaped material extend from the first surface to the second surface of the first, second and third wearable material layers; and a releasable connector extending from the base mounting plate for releasably attaching the base mounting plate to a turbine component.

20. The wear indication system of claim 19, wherein the metallic foil has a thickness of between about 0.005 inch and about 0.020 inch and wherein the first and second wearable material layers have generally cylindrically shaped side surfaces.

* * * * *